US011571968B2

(12) United States Patent
Foley et al.

(10) Patent No.: US 11,571,968 B2
(45) Date of Patent: Feb. 7, 2023

(54) DISPLAY ASSEMBLY HAVING A FEATURE ILLUMINATING SYSTEM

(71) Applicant: THE BOEING COMPANY, Chicago, IL (US)

(72) Inventors: Samuel A. Foley, Everett, WA (US); Jagdish T. Madhav, Bothell, WA (US); John C. Beckman, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 321 days.

(21) Appl. No.: 15/931,682

(22) Filed: May 14, 2020

(65) Prior Publication Data
US 2021/0354558 A1    Nov. 18, 2021

(51) Int. Cl.
*B60K 35/00* (2006.01)
*F21V 8/00* (2006.01)

(52) U.S. Cl.
CPC .............. *B60K 35/00* (2013.01); *G02B 6/001* (2013.01); *G02B 6/0006* (2013.01); *B60K 2370/336* (2019.05)

(58) Field of Classification Search
CPC ..... B60K 2370/336; B60K 35/00; B60Q 3/62
See application file for complete search history.

(56) References Cited

U.S. PATENT DOCUMENTS

| | | | | |
|---|---|---|---|---|
| 4,917,448 A * | 4/1990 | Oppenheimer | ......... | G09F 9/305 362/559 |
| 5,101,466 A * | 3/1992 | Reidinger | ............... | B29C 48/07 385/115 |
| 5,452,186 A * | 9/1995 | Dassanayake | ....... | G02B 6/0006 362/558 |
| 6,106,140 A * | 8/2000 | Krummer | ............ | G02B 6/0008 362/543 |
| 6,195,016 B1 * | 2/2001 | Shankle | .................. | G09F 9/305 385/115 |
| 6,198,872 B1 * | 3/2001 | Lipson | .................... | G09F 9/305 385/115 |
| 6,234,657 B1 * | 5/2001 | Shih | ........................ | G09F 9/305 362/559 |
| 2004/0057251 A1 * | 3/2004 | Isaacson | .............. | G02B 6/0008 362/555 |
| 2004/0250457 A1 * | 12/2004 | Strein | ..................... | G09F 9/305 40/547 |

* cited by examiner

*Primary Examiner* — William N Harris
(74) *Attorney, Agent, or Firm* — The Small Patent Law Group LLC; Joseph M. Butscher

(57) ABSTRACT

A display assembly includes a front panel including a feature. A light source is behind the front panel. A light guide header is coupled to the light source. One or more fiber optic strands are coupled to the light guide header and routed proximate to one or more portions of the feature. The light guide header is configured to receive a portion of light emitted by the light source and guide the portion of the light into the one or more fiber optic strands to illuminate the one or more portions of the feature.

24 Claims, 6 Drawing Sheets

DISPLAY ASSEMBLY HAVING A FEATURE ILLUMINATING SYSTEM

FIELD OF EMBODIMENTS OF THE DISCLOSURE

Embodiments of the present disclosure generally relate to systems and methods for illuminating a feature, such as a logo, graphic, text, or the like, of a display assembly.

BACKGROUND OF THE DISCLOSURE

Various displays include lighting assemblies that emit light to back light features on a surface. The emitted light provides an aesthetically pleasing and noticeable effect in relation to a feature of a display.

However, the lighting assemblies may not be able to emit sufficient light in relation to particular areas of a feature. For example, one or more dark zones may be present with respect to the feature due to the nature of a lighting assembly. As another example, outer perimeter portions of a feature of a display may not be sufficiently illuminated by a lighting source behind the feature.

SUMMARY OF THE DISCLOSURE

A need exists for a system and a method of directing light to desired areas of a feature of a display. Further, a need exists for a system and a method of providing improved lighting effects with respect to a feature of a display.

With those needs in mind, certain embodiments of the present disclosure provide a display assembly including a front panel including (for example, having and/or with) a feature. A light source is behind the front panel. A light guide header is coupled to the light source. One or more fiber optic strands are coupled to the light guide header and routed proximate to one or more portions of the feature. The light guide header is configured to receive a portion of light emitted by the light source and guide the portion of the light into the one or more fiber optic strands to illuminate the one or more portions of the feature.

In at least one embodiment, a perimeter wall is coupled to the front panel. The one or more fiber optic strands are also routed proximate to one or more portions of the perimeter wall. For example, the one or more fiber optic strands extend around an outer perimeter of the feature and an internal surface of the perimeter wall.

In at least one embodiment, an internal chamber is defined between the perimeter wall (such as an interior surface of the perimeter wall) and the front panel (such as a rear surface of the front panel). The light source is disposed within the internal chamber.

In at least one embodiment, the light source includes an overlapping region. The light guide header is secured to the light source within the overlapping region. As an example, the light source includes a coiled strap extending between a first end and a second end. The coiled strap includes the overlapping region.

In at least one embodiment, the light guide header includes a transparent light inlet wall coupled to one or more opaque walls. The portion of the light is internally reflected between the transparent light inlet wall and the one or more opaque walls. One or more light ports are formed in the one or more opaque walls. The one or more fiber optic strands connect to the one or more light ports.

In at least one embodiment, the light source is configured to direct the light in a first direction. The light guide header is configured to direct the portion of the light received from the light source in a second direction that differs from the first direction.

Certain embodiments of the present disclosure provide a method of forming a display assembly. The method includes disposing a light source behind a front panel; coupling a light guide header to the light source; coupling one or more fiber optic strands to the light guide header; routing the one or more fiber optic strands proximate to one or more portions of the feature. In at least one embodiment, the method also includes receiving, by the light guide header, a portion of light emitted by the light source; guiding the portion of the light into the one or more fiber optic strands; and illuminating the one or more portions of the feature by said guiding.

Certain embodiments of the present disclosure provide a vehicle including an internal cabin, and a display assembly, as described herein, within the internal cabin.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a display assembly including a light guide header that is configured to direct light to desired areas of a feature, such as a logo, graphic, text, and/or the like. The feature may be translucent or semi-translucent. Optionally, at least a portion of the feature may be opaque or semi-opaque. It has been found that embodiments of the present disclosure provide a lighting effect that causes the feature to appear to float outwardly from a face of the display assembly. The light guide header is configured to allow edges of the feature to be illuminated and also maintain lighting of the feature by directing a portion of illuminated light to a perimeter area.

Certain embodiments of the present disclosure provide a system and method that include a light guide header that directs light within an enclosed portion of a display assembly to a perimeter of a feature, which causes the feature to appear to float. The system and method may be used with various display assemblies, such as those within an internal cabin of a vehicle.

Figure 1:
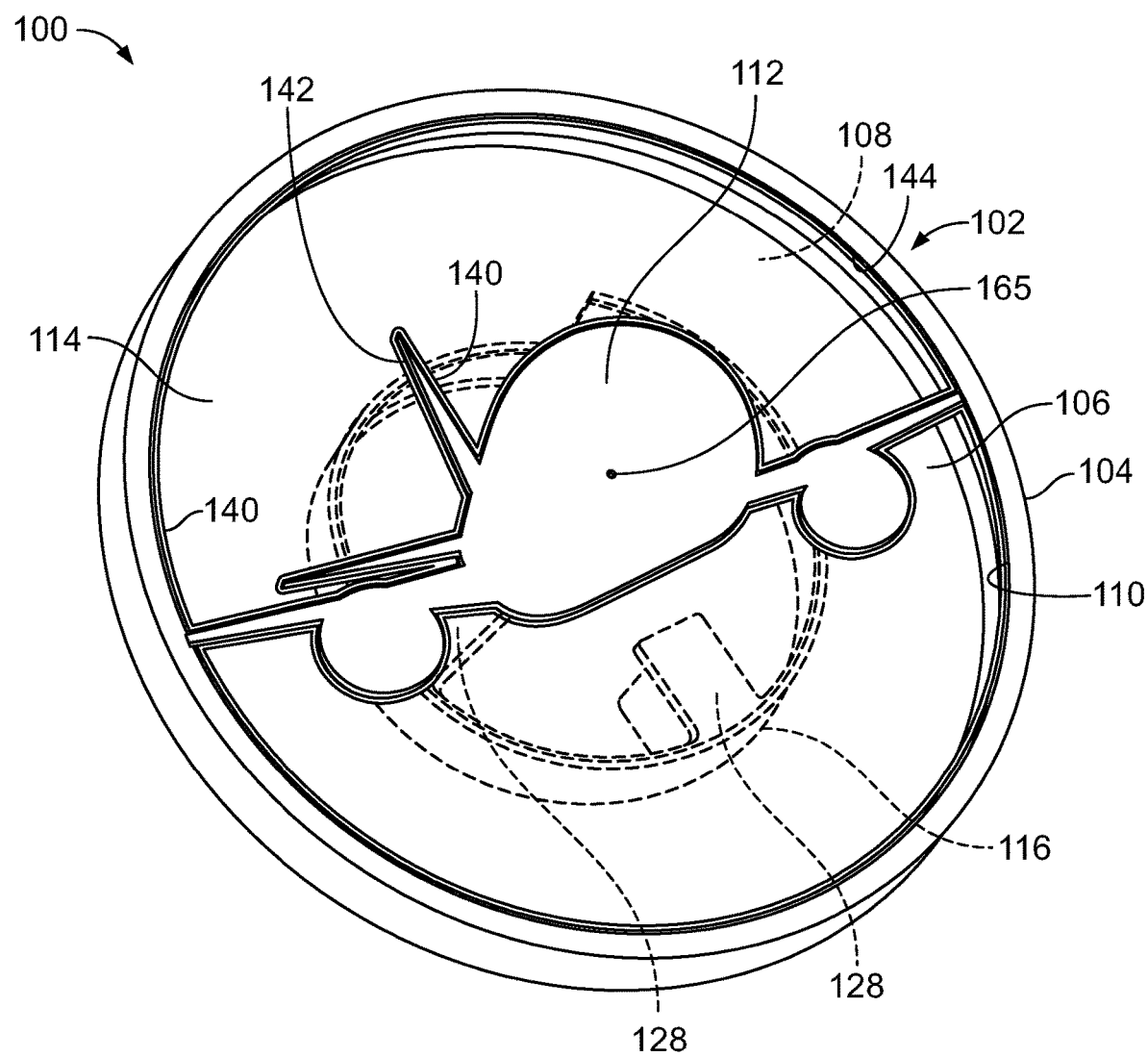
FIG. 1 illustrates a perspective front view of a display assembly, according to an embodiment of the present disclosure.

FIG. 1 illustrates a perspective front view of a display assembly 100, according to an embodiment of the present disclosure. The display assembly 100 includes a housing 102 that includes a perimeter wall 104 and a front panel 106 connected to the perimeter wall 104. Optionally, a rear panel (not shown) may also be connected to the perimeter wall 104. An internal chamber 108 is defined between interior surfaces 110 of the perimeter wall 104 and the front panel 106. As shown, the perimeter wall 104 may be circular. Optionally, the perimeter wall 104 may be various other shapes, such as a square, a rectangle, triangle, other arcuate shapes, irregular shapes, whether arcuate and/or linear, and/or the other like.

The front panel 106 includes a feature 112. In at least one embodiment, the feature 112 outwardly extends from a base 114 of the front panel 106. For example, the feature 112 may be an embossed or otherwise raised surface of the front panel 106. As another example, the feature 112 may be a recessed or depressed surface extending inwardly from the base 114. As another example, the feature 112 can be coplanar or substantially coplanar with the base 114, such as a print on the base 114.

In at least one embodiment, the feature 112 is a logo, such as that of a company. For example, the feature 112 is a graphic or text that identifies that company. As another example, the feature 112 is a graphic, text, or the like, whether or not associated with a logo. For example, the feature 112 can be an instruction, message, identifier (such as that of an area of an internal cabin, a seat within the internal cabin, etc.), and/or the like. In short, the feature 112 can be any text, graphic, or the like as desired. In the example of FIG. 1, the feature 112 is a graphic representing an aircraft.

A light source 116 is secured within the internal chamber 108 behind the feature 112. For example, the light source 116 is secured to a rear surface of the base 114, such as through one or more of adhesives, bonding, fasteners, and/or the like. The light source 116 is configured to emit light that illuminates the feature 112.

Figure 2:
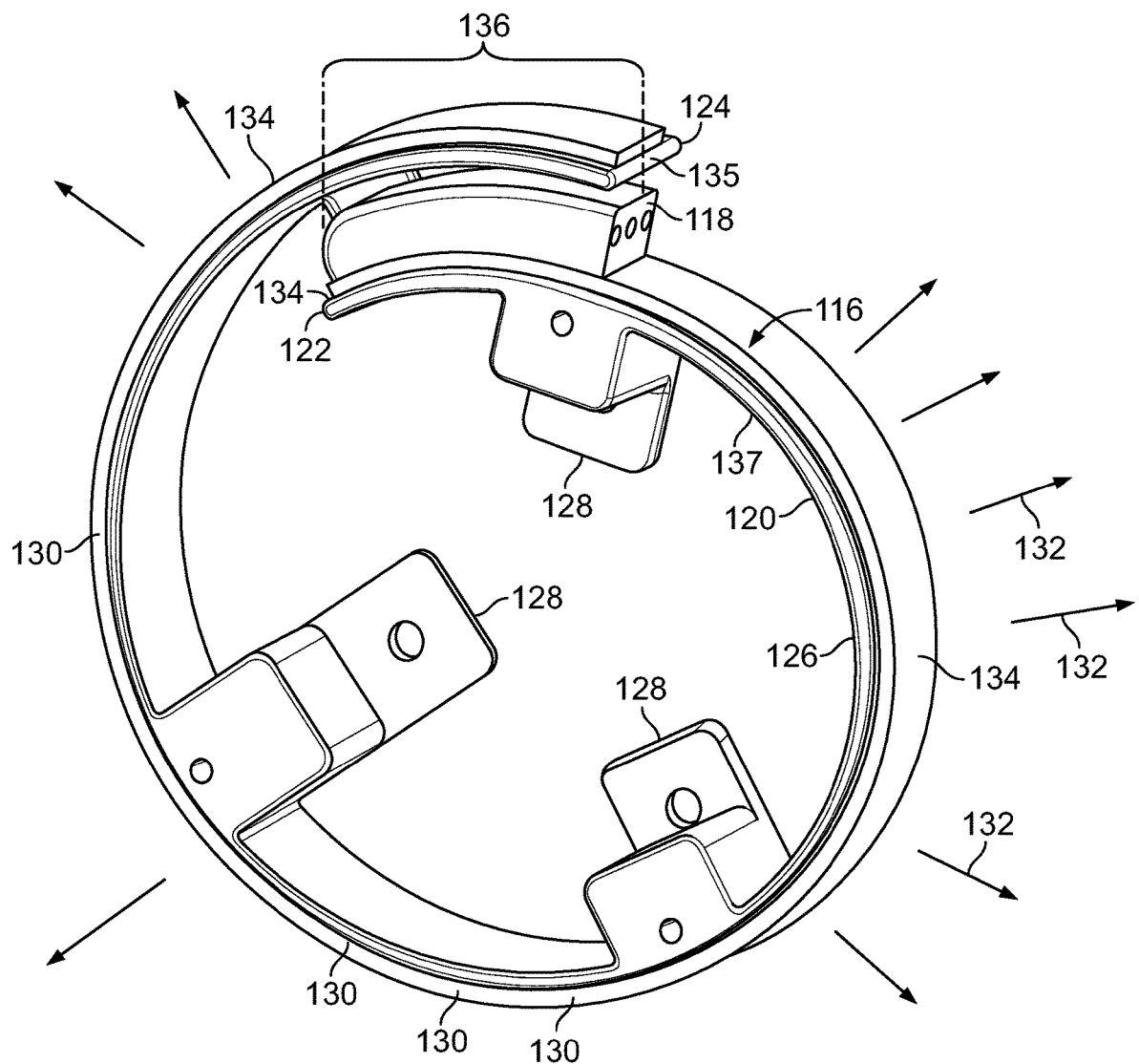
FIG. 2 illustrates a perspective front view of a light guide header secured to a light source, according to an embodiment of the present disclosure.

FIG. 2 illustrates a perspective front view of a light guide header 118 secured to the light source 116, according to an embodiment of the present disclosure. In at least one embodiment, the light source 116 is a flexible structure including a coiled main body 120 having a first end 122 that connects to a second end 124 through a coiled strap 126. One or more securing brackets 128 extend from the coiled strap 126. The securing brackets 128 secure the light source 116 and the light guide header 118 to the rear surface of the front panel 106 (shown in FIG. 1), such as through one or more of adhesives, bonding, fasteners, and/or the like.

The coiled strap 126 includes one or more light emitting devices 130, such as light emitting diodes (LEDs), incandescent bulbs, fluorescent bulbs, a flexible light ribbon, and/or the like. The light emitting devices 130 are configured to emit light 132 radially outward from an external surface 134 of the coiled strap 126.

As shown, the coiled strap 126 proximate to the second end 124 overlaps the coiled strap 126 proximate to the first end 122, thereby forming an overlapping region 136. In the overlapping region 136, light 132 emitted by the light source 116 is blocked by the coiled strap 126 proximate to the second end 124. Optionally, the overlapping region 136 may be formed by a light source that does not include a coiled strap. For example, a light source may include light emitting devices or elements, some of which may overlap portions of other light emitting devices or elements.

In at least one embodiment, the light guide header 118 is mounted to the coiled strap 126 within the overlapping region 136. For example, the light guide header 118 is mounted to the external surface 134 proximate to the first end 122 (such as through one or more of adhesives, bonding, fasteners, and/or the like), and underneath the coiled strap 126 proximate to the second end 124. The light guide header 118 may or may not also be mounted to an internal surface 135 of the coiled strap 126 proximate to the second end 124.

Referring to FIGS. 1 and 2, the light source 116 is connected to a power source (not shown), such as a source of direct or alternating current, a battery, or the like. Fiber optic strands 140 extend to and/or around desired portions of the front panel 106 and/or the perimeter wall 104. For example, fiber optic strands 140 extend to connect around an outer perimeter 142 (which may be or otherwise include a translucent plastic light pipe) of the feature 112 and/or an internal surface 144 of the perimeter wall 104. The fiber optic strands 140 may be located at various other areas, as desired.

The fiber optic strands 140 are coupled to the light guide header 118. In operation, a portion of the light 132 that is emitted by the light source 116 is received by the light guide header 118, which internally reflects the received light 132 and directs the light 132 into the fiber optic strands 140. Accordingly, the fiber optic strands 140 are illuminated, which in turn illuminates desired areas of the display assembly 100, such as around the outer perimeter 142 of the feature 112, and the internal surface 144 of the perimeter wall 104, which causes the feature 112 to appear to outwardly float in relation to the base 114 of the front panel 106.

The light source 116 may be sized and shape differently than shown. In at least one embodiment, the light source 116 does not include the overlapping region 136. The light guide header 118 may be secured to any external surface of the light source 116, whether or not within the overlapping region 136. As another example, the light source 116 may not include a coiled body. For example, the light source 116 may include one or more point light sources secured to the rear surface of the front panel 106, or otherwise secured within the internal chamber 108. The light source 116 can be various light sources, light engines, or the like other than a flexible light source.

Figure 3A:
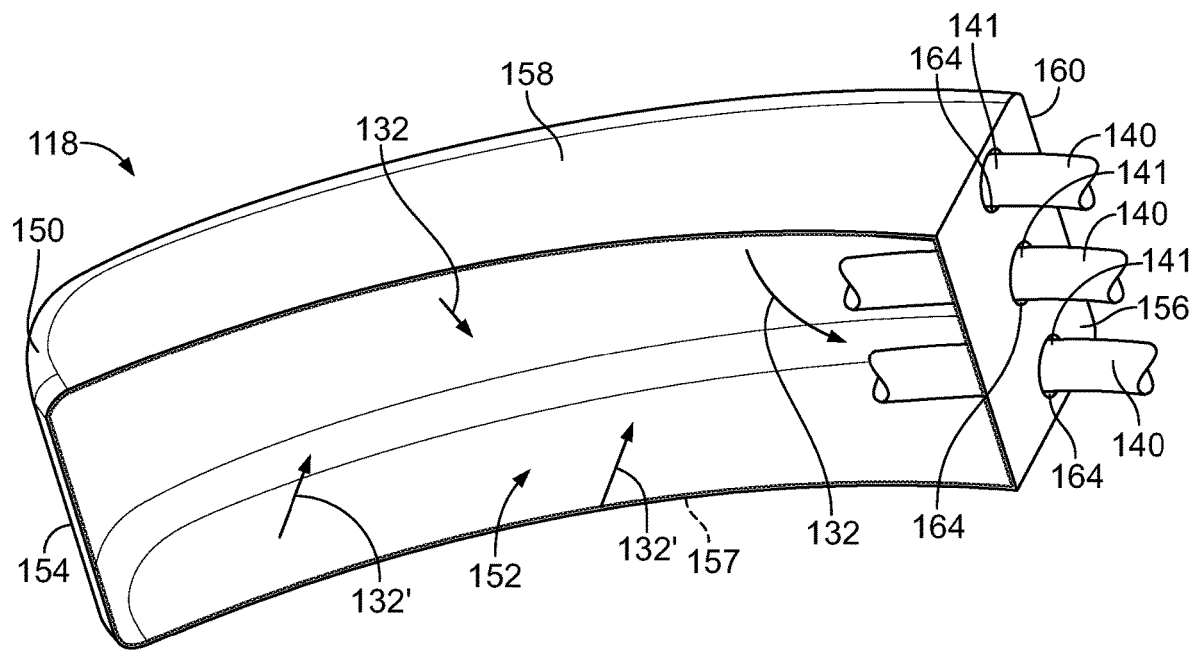
FIG. 3A illustrates a perspective bottom view of the light guide header, according to an embodiment of the present disclosure.
Figure 3B:
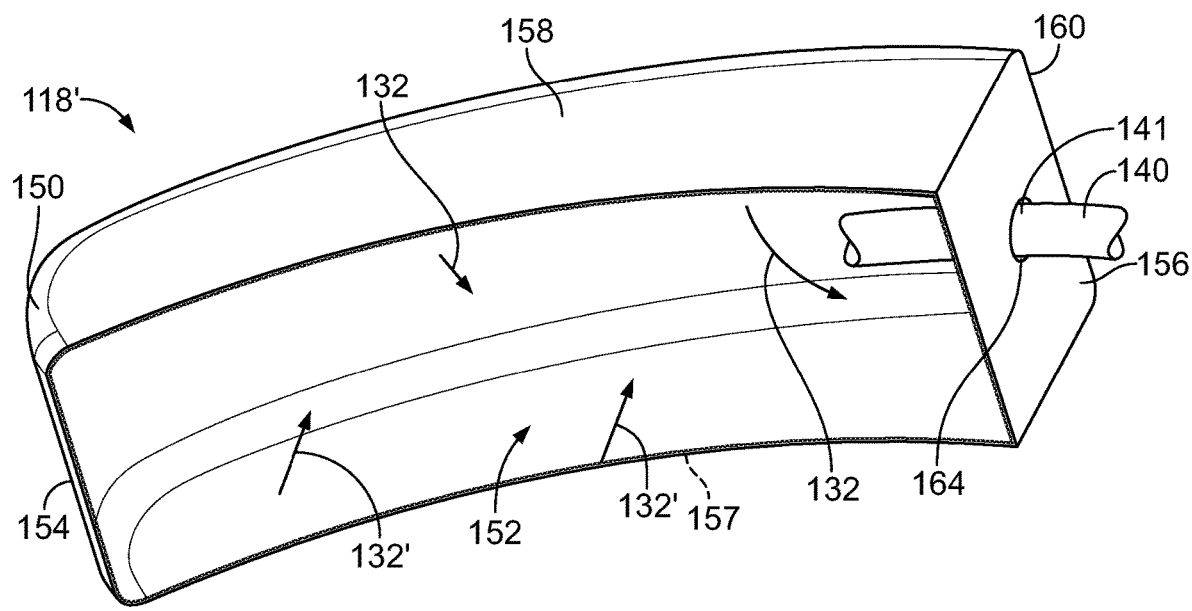
FIG. 3B illustrates a perspective bottom view of the light guide header, according to another embodiment of the present disclosure.
Figure 4:
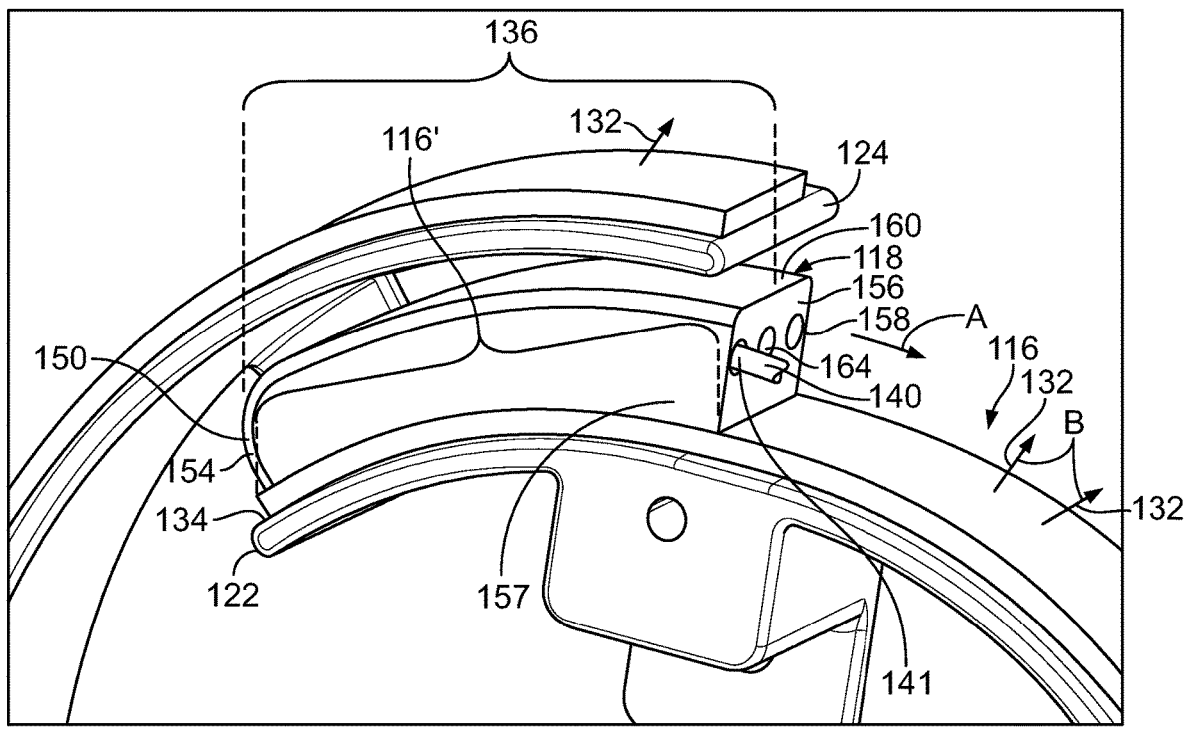
FIG. 4 illustrates a perspective front view of the light guide header secured to the light source.

FIG. 3A illustrates a perspective bottom view of the light guide header 118, according to an embodiment of the present disclosure. FIG. 4 illustrates a perspective front view of the light guide header 118 secured to the light source 116. Referring to FIGS. 3 and 4, the light guide header 118 includes a main body 150, which may be formed of a clear polymer, such as polycarbonate. The main body 150 includes a light inlet wall 152, such as at a lower surface. The light inlet wall 152 is clear and transparent.

The light inlet wall 152 connects to a first end wall 154, a second end wall 156 that is opposite from the first end wall 154, a first side wall 157, and a second side wall 158 opposite from the first side wall 157. An outer reflecting wall 160 connects to the first end wall 154, the second end wall 156, the first side wall 157, and the second side wall 158 opposite from the light inlet wall 152.

In contrast to the light inlet wall 152, each of the first end wall 154, the second end wall 156, the first side wall 157, the second side wall 158, and the outer reflecting wall 160 is coated, covered, or otherwise formed with opaque surfaces. That is, the first end wall 154, the second end wall 156, the first side wall 157, the second side wall 158, and the outer reflecting wall 160 are opaque walls. For example, the first end wall 154, the second end wall 156, the first side wall 157, the second side wall 158, and the outer reflecting wall 160 are painted opaque white, formed as mirrored surfaces, and/or the like.

In at least one embodiment, the main body 150 is formed as a solid piece of material. For example, the main body 150 may be formed from a solid piece of acrylic, polycarbonate, a nylon, or the like, which are configured to transmit visible light, and have desired refractions of indices. In other embodiments, the main body 150 may not be a solid manifold mixing multiple channels, but instead may include individual different light guide bodies carrying one channel of light each. Such examples may be useful for logos or artwork that utilize segment controlled RGB light engines, light engines that utilize different white color correlated temperatures (CCT), and/or multiple light engines. Each individual light guide may be disposed in a particular position within the feature 112 to illuminate a respective color point as desired to achieve a desired effect. Embodiments can also be utilized with respect to other wavelengths in the electromagnetic spectrum, such as, but not limited to, near infrared. As another example, an internal hollow chamber is defined between the light inlet wall 152, the first end wall 154, the second end wall 156, the first side wall 157, the second side wall 158, and the outer reflecting wall 160.

As shown, one or more light ports 164 are formed in the second end wall 156. The light ports 164 can be channels, openings, or the like that are formed into and through the second end wall 156, and may extend into the main body 150. Input ends 141 of the fiber optic strands 140 are disposed within the light ports 164.

The light guide header 118 can include more or less light ports 164 than shown. Further, more or less fiber optic strands 140 than shown can be used. In an example, one fiber optic strand is used. For instance, FIG. 3B illustrates an example light guide header 118' that includes a single fiber optic strand 140. Within other examples, three, four, or more fiber optics strands 140 are used. The light port(s) 164 can be formed in other portions of the main body 150, other than shown. For example, the light ports 164 can be formed in the first end wall 154 instead of, or in addition to, the second end wall 156. As another example, one or more light ports 164 can be formed in the first side wall 157 and/or the second side wall 158.

Referring to FIGS. 1-4, the fiber optic strands 140 are routed to desired areas of the display assembly 100. The fiber optic strands 140 can be routed to various areas where the light 132 emitted from the light source 116 would not otherwise be able to reach, such as within an area bounded by an internal surface 137 of the light source 116 that is closer to the first end 122 than the second end 124. As another example, at least one fiber optic strand 140 can be routed to a center 165 of the display assembly 100.

As shown, the light guide header 118 includes curved surfaces. For example, the light inlet wall 152 has a curvature that conforms to the external surface 134 of the light source 116 where the light guide header 118 secures to the light source 116. Optionally, the light guide header 118 can be sized and shaped differently than shown.

In operation, the light source 116 emits the light 132 radially outward and away from the external surface 134. A portion of the light 132 that is emitted from the light source 116 passes into the light guide header 118 through the light inlet wall 152. Because the light inlet wall 152 is transparent, the light 132 is able to pass into the light guide header 118. Inside the light guide header 118, the light internally reflects therein (such as between the light inlet wall 152, the first end wall 154, the second end wall 156, the first side wall 157, the second side wall 158, and the outer reflecting wall 160). The light 132 that is internally reflected within the light guide header 118 passes into the light ports 164 and into the fiber optic strands 140, which, in turn, direct the light 132 to desired areas, as dictated by the locations of the fiber optic strands 140. As such, the fiber optic strands 140 are illuminated, which in turn illuminates desired areas of the display assembly 100, such as around the outer perimeter 142 (for example, a translucent plastic light pipe) of the feature 112, and the internal surface 144 of the perimeter wall 104, which causes the feature 112 to appear to outwardly float in relation to the base 114 of the front panel 106.

As described, the light guide header 118 allows light 132 to be directed into the fiber optic strands 140, which are routed to desired areas of the display assembly 100. In at least one embodiment, the light 132 directed out of the light guide header 118 is in a first direction A that differs from a second direction B of the light 132 that is directed outwardly from the light source 116. For example, the light 132 directed into the light ports 164 and into the fiber optic strands 140 is in a circumferential direction with respect to the light source 116 (in contrast to radially outward from the light source 116). Optionally, the light 132 directed out of the light guide header 118 and the light 132 directed out of the light source may be in the same direction. In at least one embodiment, the light source 116 directs the light 132 in the direction B, and the light guide header 118 directs the portion of the light 132 received from the light source 116 in the direction A that differs from the direction B.

The outer perimeter 142 of the feature 112 and the internal surface 144 of the perimeter wall 104 are illuminated by the fiber optic strands 140, which receive a portion of the light 132 that is emitted by the light source 116, which also backlights the feature 112. As noted, the feature 112 can be or include a company logo, company name, message, advertisement, etc., thereby providing a desirable aesthetic and/or branding opportunity, for example, within an internal cabin of a vehicle, for example.

As described herein, the display assembly 100 includes the front panel 106 including the feature 112. The light source 116 is behind the front panel 106. The light guide header 118 is coupled to the light source 116. One or more fiber optic strands 140 are coupled to the light guide header 118 and routed proximate to one or more portions of the feature 112 (such as on or adjacent one or more portions of the outer perimeter 142 and/or one or more internal portions of the feature 112). Within examples, the one or more portions of the outer perimeter 142 include the entire outer perimeter. Within other examples, the one or more portions of the outer perimeter 142 include a part(s) of the outer perimeter 142 (for example, the top half of the outer perimeter). The light guide header 118 is configured to receive a portion of light 132 emitted by the light source 116 and guide the portion of the light 132 into the fiber optic strand(s) 140 to illuminate the portion(s) of the feature 112. Within example, the portion of light 132 emitted by the light source 116 that is received by the light guide member 118 is the portion 132' of light 132 that is emitted by the part 116' of the light source 116 within the overlapping region 136 that is adjacent to (for example, underneath) the light guide header 118.

In at least one embodiment, the perimeter wall 104 is coupled to the front panel. 106. The fiber optic strands 140 can also be routed proximate to one or more portions of the perimeter wall 104 (such as on or adjacent one or more portions of the internal surface 144). Within examples, the one or more portions of the perimeter wall 104 include the entire perimeter wall. Within other examples, the one or more portions of the perimeter wall include part of the perimeter wall (for example, 25% of the perimeter wall, 50% of the perimeter wall, 75% of the perimeter wall, etc.).

Figure 5:
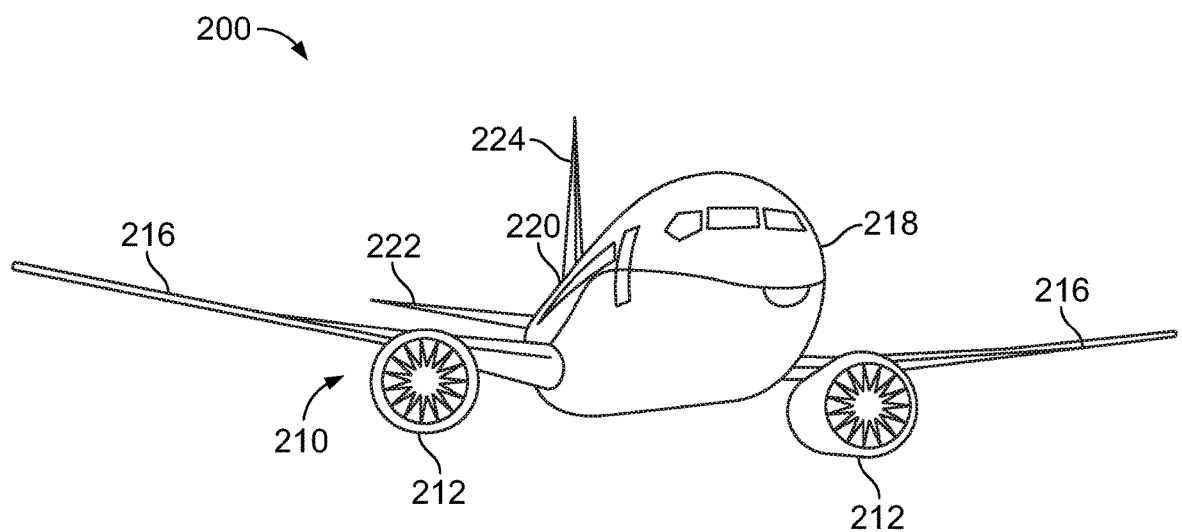
FIG. 5 illustrates a perspective front view of an aircraft.

FIG. 5 illustrates a perspective front view of an aircraft 200. The aircraft 200 includes a propulsion system 210 that may include two engines 212, for example. Optionally, the propulsion system 210 may include more engines 212 than shown. The engines 212 are carried by wings 216 of the aircraft 200. In other embodiments, the engines 212 may be carried by a fuselage 218 and/or an empennage 220. The empennage 220 may also support horizontal stabilizers 222 and a vertical stabilizer 224. The wings 216, the horizontal stabilizers 222, and the vertical stabilizer 224 may each include one or more control surfaces.

Figure 6:
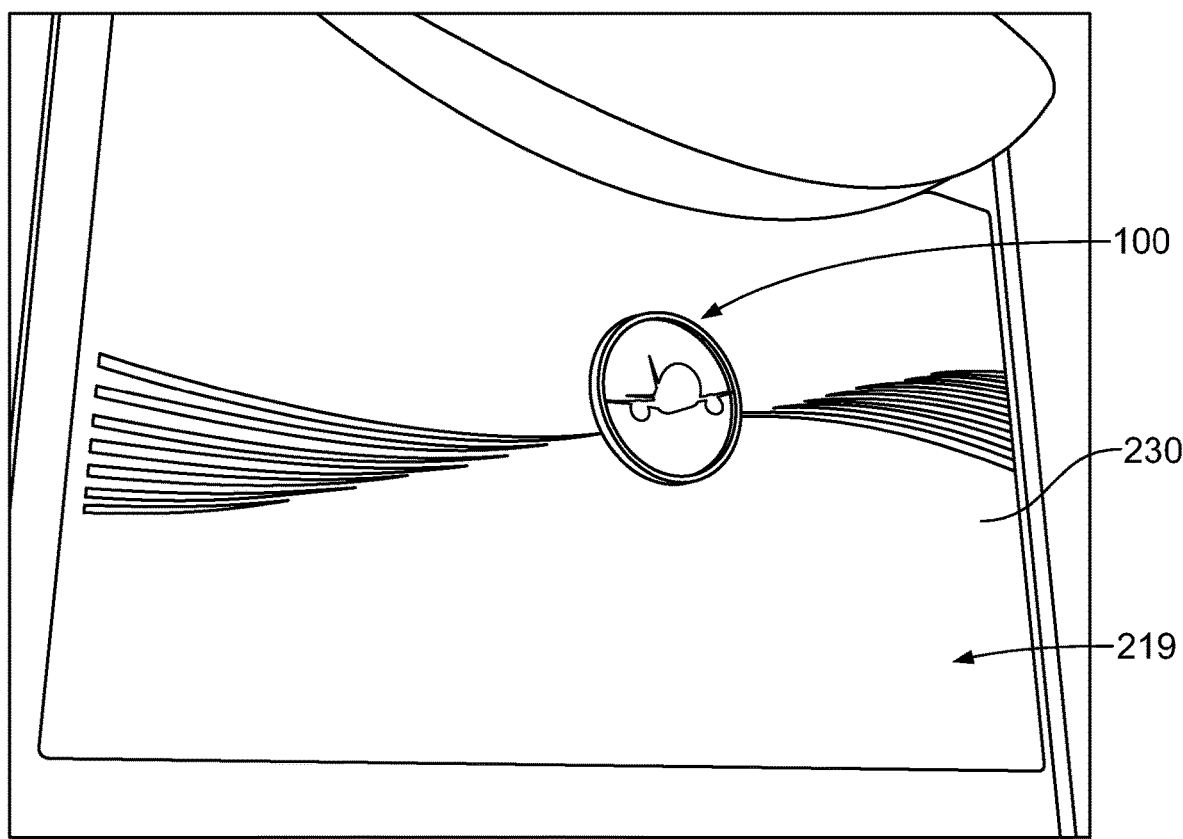
FIG. 6 illustrates a perspective front view of the display assembly on a wall within an internal cabin of the aircraft, according to an embodiment of the present disclosure.

FIG. 6 illustrates a perspective front view of the display assembly 100 on a wall 230 within an internal cabin 219 of the aircraft 200, according to an embodiment of the present disclosure. Referring to FIGS. 5 and 6, the display assembly 100 may be located at various areas of the internal cabin 219, such as on the wall 230, a partition, a monument, a stowage bin assembly, on a seat, and/or the like. Optionally, embodiments of the present disclosure may be used with respect to various other structures, such as other vehicles (including automobiles, watercraft, spacecraft, and the like), buildings, appliances, and the like.

Referring to FIGS. 1-6, available space and complexity within an internal cabin of a commercial aircraft often limits opportunities for illuminated aesthetic features and branding opportunities. Designing and certifying complex electrical illuminated features is costly and time consuming. Embodiments of the present disclosure provide the display assembly 100 including the light guide header 118 that provides multiple opportunities for aesthetically-pleasing light effects, branding opportunities, illuminated graphics, and the like without incurring the costs and complexities of complex solutions.

Figure 7:
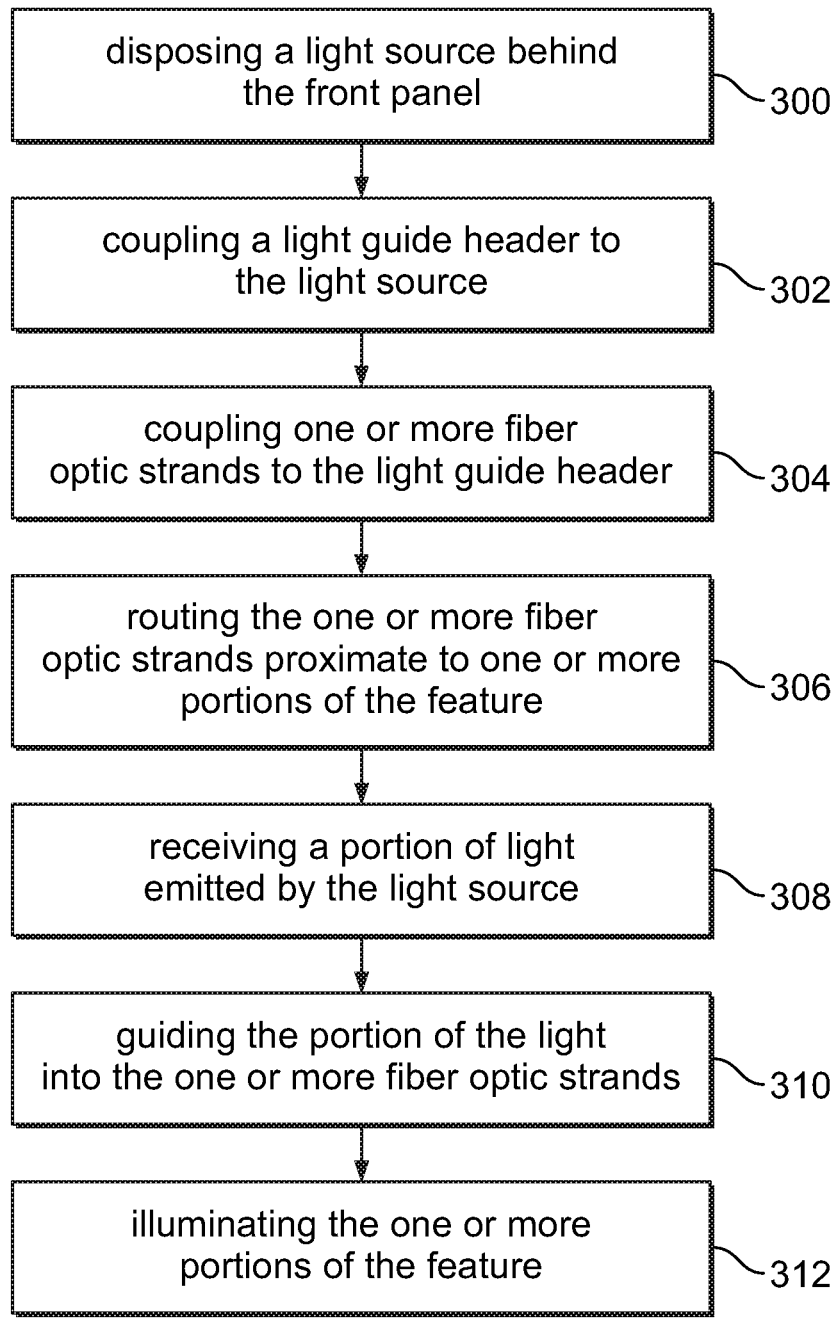
FIG. 7 illustrates a flow chart of a method of forming a display assembly, according to an embodiment of the present disclosure.

FIG. 7 illustrates a flow chart of a method of forming a display assembly, according to an embodiment of the present disclosure. The method includes disposing, at 300, a light source behind a front panel; coupling, at 302, a light guide header to the light source; coupling, at 304, one or more fiber optic strands to the light guide header; and routing, at 306, the one or more fiber optic strands proximate to one or more portions of the feature. In at least one embodiment, the method also includes receiving, by the light guide header at 308, a portion of light emitted by the light source; guiding, at 310, the portion of the light into the one or more fiber optic strands; and illuminating, at 312, the one or more portions of the feature (for example, a graphic design) by said guiding 310.

In at least one example, the method also includes coupling a perimeter wall to the front panel. As a further example, said routing 306 further includes routing the one or more fiber optic strands proximate to one or more portions of the perimeter wall. As another example, said routing 306 further includes extending the one or more fiber optic strands around an outer perimeter of the feature and an internal surface of the perimeter wall. In at least one example, said disposing 300 includes disposing the light source within an internal chamber defined between the perimeter wall and the front panel.

In at least one embodiment, said coupling 302 the light guide header to the light source includes securing the light guide header to the light source within an overlapping region of the light source.

In at least one embodiment, the light source includes a coiled strap extending between a first end and a second end. The coiled strap includes the overlapping region.

In at least one embodiment, said guiding 310 includes internally reflecting the portion of the light between a transparent light inlet wall and one or more opaque walls; and directing the portion of the light into the one or more fiber optic strands through one or more light ports formed in the one or more opaque walls.

As a further example, the method also includes directing the light emitted by the light source in a first direction; and directing the portion of the light by the light guide header in a second direction that differs from the first direction.

Embodiments of the present disclosure provide systems and methods of directing light to desired areas of a feature of a display. Further, the systems and methods provide improved lighting effects with respect to the feature of the display. In particular, it has been found that the light guide header 118 allows for the fiber optic strands 140 to be routed to areas of the display assembly 100 to provide an illuminated floating effect. Further, as described above, a light source may include light emitting devices or elements, some of which may overlap portions of other light emitting devices or elements. In such cases, light emitted by the light source can be blocked by an overlapping region (for example, blocked by the coiled strap 126 proximate to the second end 124). Example embodiments of the present disclosure provide for utilizing that light that would be blocked by the overlapping region by receiving that light and guiding that light into the one or more fiber optic strands to illuminate the one or more portions of the feature. Thus, within examples, the light guide header can collect light source energy that would otherwise not be fully utilized due to being blocked by an overlapping region.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope.

While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A display assembly, comprising:
    a front panel including a feature;
    a light source behind the front panel;
    a light guide header coupled to the light source, wherein the light guide header comprises a transparent light inlet wall coupled to one or more opaque walls, and one or more light ports formed in the one or more opaque walls; and
    one or more fiber optic strands coupled to the light guide header and routed proximate to one or more portions of the feature, wherein the one or more fiber optic strands connect to the one or more light ports,
    wherein the light guide header is configured to receive a portion of light emitted by the light source and guide the portion of the light into the one or more fiber optic strands to illuminate the one or more portions of the feature, wherein the portion of the light is internally reflected between the transparent light inlet wall and the one or more opaque walls.

2. The display assembly of claim 1, further comprising a perimeter wall coupled to the front panel.

3. The display assembly of claim 2, wherein the one or more fiber optic strands are also routed proximate to one or more portions of the perimeter wall.

4. The display assembly of claim 2, wherein the one or more fiber optic strands extend around an outer perimeter of the feature and an internal surface of the perimeter wall.

5. The display assembly of claim 2, wherein an internal chamber is defined between the perimeter wall and the front panel, and wherein the light source is disposed within the internal chamber.

6. The display assembly of claim 1, wherein the light source comprises an overlapping region, and wherein the light guide header is secured to the light source within the overlapping region.

7. The display assembly of claim 6, wherein the light source comprises a coiled strap extending between a first end and a second end, wherein the coiled strap includes the overlapping region.

8. The display assembly of claim 1, wherein the light source is configured to direct the light in a first direction, and wherein the light guide header is configured to direct the portion of the light received from the light source in a second direction that differs from the first direction.

9. A method of forming a display assembly, the method comprising:
    disposing a light source behind a front panel;
    coupling a light guide header to the light source;
    coupling one or more fiber optic strands to the light guide header;
    routing the one or more fiber optic strands proximate to one or more portions of a feature;
    receiving, by the light guide header, a portion of light emitted by the light source;
    guiding the portion of the light into the one or more fiber optic strands, wherein said guiding comprises internally reflecting the portion of the light between a transparent light inlet wall and one or more opaque walls, and directing the portion of the light into the one or more fiber optic strands through one or more light ports formed in the one or more opaque walls; and
    illuminating the one or more portions of the feature by said guiding.

10. The method of claim 9, further comprising coupling a perimeter wall to the front panel.

11. The method of claim 10, wherein said routing further comprises routing the one or more fiber optic strands proximate to one or more portions of the perimeter wall.

12. The method of claim 10, wherein said routing comprises extending the one or more fiber optic strands around an outer perimeter of the feature and an internal surface of the perimeter wall.

13. The method of claim 10, wherein said disposing comprises disposing the light source within an internal chamber defined between the perimeter wall and the front panel.

14. The method of claim 9, wherein said coupling the light guide header to the light source comprises securing the light guide header to the light source within an overlapping region of the light source.

15. The method of claim 14, wherein the light source comprises a coiled strap extending between a first end and a second end, wherein the coiled strap includes the overlapping region.

16. The method of claim 9, further comprising:
    directing the light emitted by the light source in a first direction; and
    directing the portion of the light by the light guide header in a second direction that differs from the first direction.

17. A vehicle comprising:
    an internal cabin; and
    a display assembly within the internal cabin, wherein the display assembly comprises:
    a front panel including a feature;
    a perimeter wall coupled to the front panel;
    a light source behind the front panel, wherein the light source is configured to direct the light in a first direction;

a light guide header coupled to the light source, wherein the light guide header is configured to directs a portion of the light received from the light source in a second direction that differs from the first direction; and one or more fiber optic strands coupled to the light guide header and routed around an outer perimeter of the feature and an internal surface of the perimeter wall, wherein the light guide header is configured to receive the portion of the light emitted by the light source and guide the portion of the light into the one or more fiber optic strands to illuminate the outer perimeter of the feature and the internal surface of the perimeter wall.

18. The vehicle of claim 17, wherein the light source comprises a coiled strap extending between a first end and a second end, wherein the coiled strap forms an overlapping region, and wherein the light guide header is secured to the light source within the overlapping region.

19. The vehicle of claim 17, wherein the light guide header comprises:

a transparent light inlet wall coupled to one or more opaque walls, wherein the portion of the light is internally reflected between the transparent light inlet wall and the one or more opaque walls; and one or more light ports formed in the one or more opaque walls, wherein the fiber optic strands connect to the one or more light ports.

20. The method of claim 9, wherein the light guide header is configured to receive a portion of light emitted by the light source and guide the portion of the light into the one or more fiber optic strands to illuminate the one or more portions of the feature.

21. A display assembly, comprising:
a front panel including a feature;
a perimeter wall coupled to the front panel;
a light source behind the front panel;
a light guide header coupled to the light source; and
one or more fiber optic strands coupled to the light guide header and routed proximate to one or more portions of the feature, wherein the one or more fiber optic strands extend around an outer perimeter of the feature and an internal surface of the perimeter wall,
wherein the light guide header is configured to receive a portion of light emitted by the light source and guide the portion of the light into the one or more fiber optic strands to illuminate the one or more portions of the feature.

22. A display assembly, comprising:
a front panel including a feature;
a light source behind the front panel, wherein the light source comprises a coiled strap extending between a first end and a second end, wherein the coiled strap includes an overlapping region;
a light guide header coupled to the light source, wherein the light guide header is secured to the light source within the overlapping region; and
one or more fiber optic strands coupled to the light guide header and routed proximate to one or more portions of the feature,
wherein the light guide header is configured to receive a portion of light emitted by the light source and guide the portion of the light into the one or more fiber optic strands to illuminate the one or more portions of the feature.

23. A method of forming a display assembly, the method comprising:
disposing a light source behind a front panel;
coupling a perimeter wall to the front panel;
coupling a light guide header to the light source;
coupling one or more fiber optic strands to the light guide header; and
routing the one or more fiber optic strands proximate to one or more portions of a feature, wherein said routing comprises extending the one or more fiber optic strands around an outer perimeter of the feature and an internal surface of the perimeter wall.

24. A method of forming a display assembly, the method comprising:
disposing a light source behind a front panel;
coupling a light guide header to the light source, wherein the light source comprises a coiled strap extending between a first end and a second end, wherein the coiled strap includes an overlapping region, and wherein said coupling the light guide header to the light source comprises securing the light guide header to the light source within the overlapping region;
coupling one or more fiber optic strands to the light guide header; and
routing the one or more fiber optic strands proximate to one or more portions of a feature.

* * * * *